(12) United States Patent
Alizon et al.

(10) Patent No.: US 7,607,412 B2
(45) Date of Patent: Oct. 27, 2009

(54) AIR SUPPLY DISTRIBUTOR FOR AN INTERNAL COMBUSTION ENGINE

(75) Inventors: Franck Alizon, Verneuil-sur-Seine (FR); Pierre Anthoine, Rueil-Malmaison (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/095,810

(22) PCT Filed: Nov. 23, 2006

(86) PCT No.: PCT/FR2006/051216
§ 371 (c)(1),
(2), (4) Date: Sep. 12, 2008

(87) PCT Pub. No.: WO2007/063239
PCT Pub. Date: Jun. 7, 2007

(65) Prior Publication Data
US 2009/0013956 A1 Jan. 15, 2009

(30) Foreign Application Priority Data
Dec. 1, 2005 (FR) ................................. 05 12205

(51) Int. Cl.
*F02M 35/10* (2006.01)
(52) U.S. Cl. ........................ 123/184.38; 123/184.45
(58) Field of Classification Search ................ 123/184.38–184.45

See application file for complete search history.

(56) References Cited

FOREIGN PATENT DOCUMENTS

| DE | 100 28 047 | | 12/2001 |
|----|-----------|---|---------|
| EP | 1 455 081 | | 9/2004 |
| JP | 03070853 A | * | 3/1991 |
| JP | 11 350963 | | 12/1999 |
| JP | 2003 074357 | | 3/2003 |

OTHER PUBLICATIONS

U.S. Appl. No. 12/095,809, filed Jul. 24, 2008, Alizon, et al.

* cited by examiner

*Primary Examiner*—Noah Kamen
(74) *Attorney, Agent, or Firm*—Oblon, Spivak, McClelland, Maier & Neustadt, L.L.P.

(57) ABSTRACT

An air distributor including a cylindrical tubular body including connecting channels supplying cylinders of an internal combustion engine, branches of which open in an aligned manner along a generatrix of the tubular body. The tubular body extends upstream into branches of a 180° elbow that opens at an air inlet, the elbow being inclined in relation to the diametral plane of the tubular body containing generatrix. The distributor includes a ramp partially throttling an air flow area of the main body to reduce a drop in swirl in the first distributed cylinder induced by the inclined elbow distributor, the ramp provided upstream close to the connecting channels branches of the first distributed cylinder on the elbow inclination side. The ramp can have gently- and steeply-inclined upstream and downstream faces. The distributor can mount to an intake face of a diesel engine cylinder head with two intake ducts per cylinder.

12 Claims, 2 Drawing Sheets

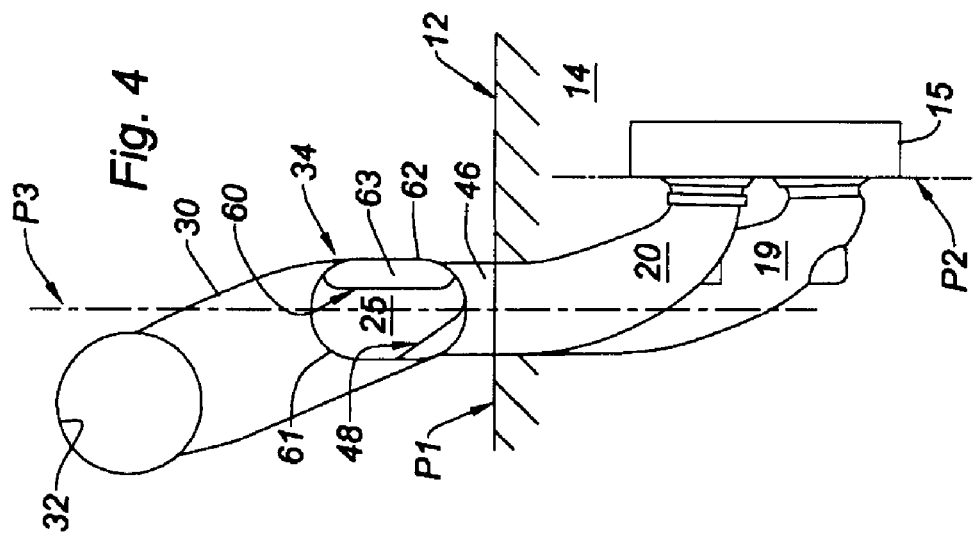
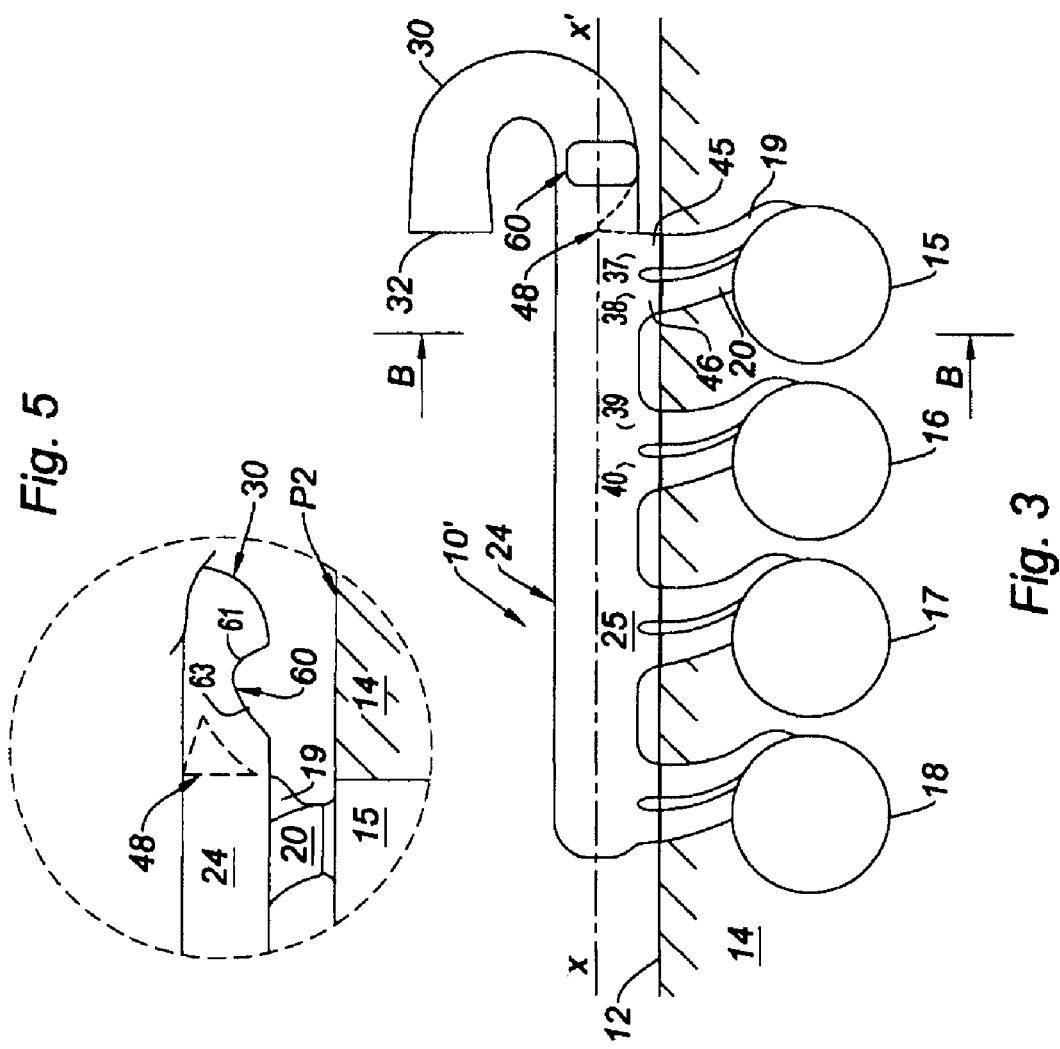

AIR SUPPLY DISTRIBUTOR FOR AN INTERNAL COMBUSTION ENGINE

BACKGROUND OF THE INVENTION

The present invention relates to an intake air distributor for the cylinders of an internal combustion engine, in particular for motor vehicles, with the understanding that the term "air" must be considered in its broad sense and in particular to cover any gas intake mixture, in particular air/fuel mixtures.

In general, the intake air distribution in the cylinders of an internal combustion engine is carried out while attempting to eliminate or substantially reduce any imbalance in the feed to each of the cylinders, both for a given cylinder in case of a plurality of intake ducts and for the distribution between the cylinders. In diesel engines in particular, for which the aerodynamics of the intake gases is critical, drops in "swirl" have been observed in certain cylinders, in particular in the first distributed cylinder, caused by the geometry of the distributor ("swirl" can be defined as an axial eddy in the cylinder). This is true in particular of air distributors bent at 180°, particularly when, for reasons of size and compactness of the engines to be mounted in the engine compartment of a motor vehicle, the elbow is inclined to a diametral reference plane of the tubular body passing through the line of alignment of the branches of the connecting channels of the cylinder intake ducts.

SUMMARY OF THE INVENTION

The invention relates to a distributor for improved supply to the first distributed cylinder with regard to the geometry of the distributor and it is a particular object of the invention to remedy the drawbacks described above.

Publication JP2003074357 for example teaches an air distributor for an internal combustion engine of the type having two intake valves per cylinder having an axial end air intake, and in which the curvatures of the connecting channels are suitable for making the "swirl" uniform between the cylinders. Publication JP63208616 also teaches an air distributor for an internal combustion engine having four cylinders in line, having one intake valve per cylinder, and a central lateral inlet between the second and third cylinders, and in which the inlet of the connecting channel of the third cylinder comprises an air guide to give the flow lines, upstream of the cylinder head, the same radius of curvature as at the second cylinder. Publication JP113509963 also teaches an air distributor without connecting channels for an internal combustion engine having three cylinders in line, of the type having one intake valve and in which projections are placed for adjusting to a constant profile between the first and second distributed cylinders and between the second and third distributed cylinders. It should be observed that the solutions proposed in these three Japanese publications for balancing the "swirl" between the cylinders only concern air distributors having particular structures that are quite different from the bent air distributors, and for which the internal aerodynamic disturbances associated with or caused by these known distributors do not exist.

The invention proposes an air distributor for an internal combustion engine comprising at least a plurality of cylinders in line, said distributor comprising a substantially cylindrical main tubular body provided with lateral connecting channels for supplying the cylinders, and whereof the branches with the main tubular body open in a substantially aligned manner along a generatrix of said main tubular body, the main tubular body extending upstream of said branches by a substantially 180° elbow opening on an air inlet, said elbow being inclined at an angle $\alpha$ to the diametral plane of said main body containing the generatrix for alignment of the branches, characterized in that it comprises, upstream and in the neighborhood of the branch or branches of the connecting channel or channels of the first distributed cylinder and on the elbow inclination side, a ramp for partial throttling of the air flow area of the main body.

As it will appear in the description, on the one hand, such an arrangement affects the internal aerodynamics of the distributor and serves to recover a "swirl" level substantially equal, in the first distributed cylinder, to the "swirl" level without distributor, thanks to a rise of the "swirl" in the first distributed cylinder and, in the case of distributors according to the invention having two connecting channels per cylinder and used with engines having two intake valves per cylinder, to regulate the flows between the two connecting channels of the same first distributed cylinder.

According to a preferred embodiment, the distributor is suitable for being mounted in parallel to the corresponding intake face of the cylinder head of said engine with the connecting channels placed opposite the intake ducts of the cylinder head corresponding to a cylinder and parallel to the cylinder alignment, so that said diametral plane is normal to said cylinder head intake face. Such an arrangement serves to improve the compactness of the engine equipped with the distributor.

According to a first alternative of the invention, the partial throttling rate is between 2 and 10% of the flow area.

According to another alternative of the invention, the ramp is in the form of an asymmetrical wheel ramp whereof the upstream and downstream faces are gently- and steeply-inclined respectively. Advantageously, the ramp is laterally inclined to said diametral plane. Preferably, the projection of the top of said ramp in a normal plane to said tubular body has an angle of inclination $\beta$ to said diametral plane of between 1 and 5 times the angle of inclination $\alpha$.

According to a further alternative of the invention, the distributor comprises substantially at the elbow outlet, facing and upstream of said ramp, a recess having an extension substantially perpendicular to the air flow direction in the tubular body. Advantageously, the recess has a convergent/divergent profile in the air flow direction in the tubular body. Such a recess or protuberance serves to improve the overall permeability of the distributor and in particular for the first distributed station, with the understanding that the permeability of a nozzle corresponds to its capacity to allow the passage of an air flow for a given energy loss and that the presence of this protuberance serves to decrease the height of the asymmetrical wheel ramp that is liable to cause a drop in permeability.

According to a further alternative of the invention, the cylindrical main tubular body has a substantially rectangular cross section with rounded angles, whereof a small side corresponds to the side of the tubular body opposite the elbow and carries said aligned branches of the connecting channels.

The invention also relates to internal combustion engines, in particular for motor vehicles, comprising at least one air distributor according to the invention in all the alternatives presented above, having one or two connecting intake channels per distributed cylinder and mounted on an intake face of the cylinder head of said engine. It relates in particular to internal combustion engines of the diesel type, in particular for a motor vehicle, comprising at least one air distributor according to the invention in all the alternatives presented above having one or two connecting channels per distributed cylinder and mounted on an intake face of the cylinder head of said engine.

BRIEF DESCRIPTION OF THE DRAWINGS

Other features and advantages of the present invention will appear from a reading of the description that follows, provided exclusively as a nonlimiting example, with reference to the appended drawings in which:

FIG. 3 shows a schematic underside view of a second embodiment of an air distributor according to the invention in place along the intake face of an internal combustion engine cylinder head;

FIG. 4 shows a schematic view along enlarged section BB of the air distributor in FIG. 3; and FIG. 5 shows a schematic partial enlarged view, with partial cutaway, of the air distributor in FIG. 3.

DETAILED DESCRIPTION OF THE PREFERRED EMBODIMENTS

Figure 2:
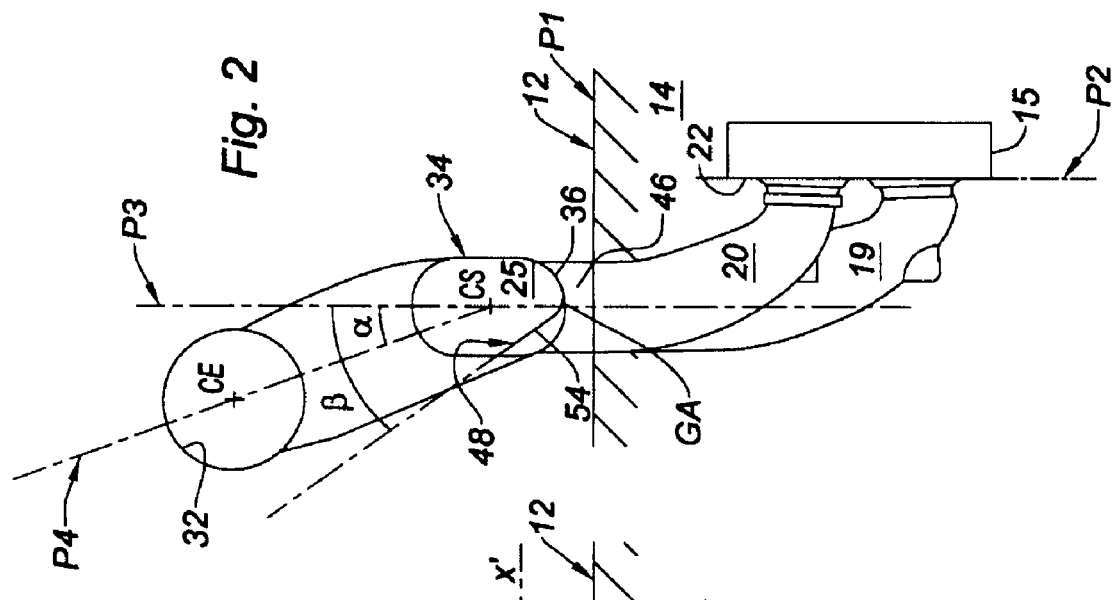
FIG. 2 shows a schematic view along enlarged section AA of the air distributor in FIG. 3.
Figure 1:
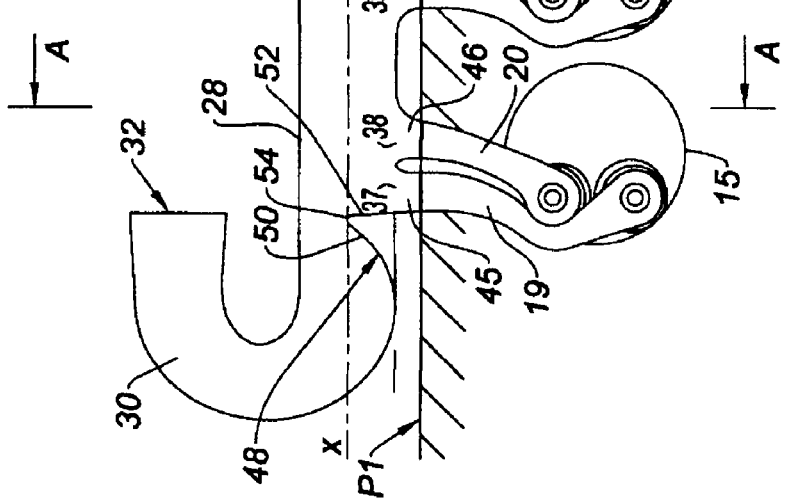
FIG. 1 shows a schematic plan view of a first embodiment of an air distributor according to the invention in place along the intake face of an internal combustion engine cylinder head.

The intake air distributor 10 shown in FIGS. 1 and 2 is shown in an operational position fixed to the intake face 12 of the cylinder head 14 of an internal combustion engine having four cylinders in line 15, 16, 17 and 18. As a nonlimiting example, the internal combustion engine integrating the cylinder head 14 is of the diesel type, particularly for a motor vehicle, but without going beyond the scope of the invention, the internal combustion engine may be of a different type, for example a 4 stroke gasoline engine, particularly for a motor vehicle.

Considering FIGS. 1 and 2, it may be observed that the cylinder head intake face 12 extends in the plane P1 normal to the plane of FIGS. 1 and 2, so that in FIG. 1, the cylinders 15 to 18 are shown from above, each having two distinct intake ducts, for example for the cylinder 15, first distributed cylinder, the ducts 19 and 20, whereof the ends, opening on the head of the cylinder 15 at the level of the combustion face 22, each carry the seat of one of the two intake valves (not shown). For the clarity of the drawing, the exhaust valves have also not been shown. As shown in FIG. 2, the combustion face 16 extends in a plane P2 normal to the plane of the FIGS. 1 and 2 and to the plane P1.

The air distributor 10 is in the form of a bent nozzle made from light alloy obtained by molding either in one piece or in suitably assembled separate elements. The distributor 10 mainly consists of a cylindrical main tubular body 24 having an axis XX' and, when the distributor is mounted operationally on the cylinder head 14, parallel to the intake face 12 and to the combustion face 22. The body 24 which has a first closed end 26 at the last distributed cylinder, the cylinder 18, is prolonged at its other end 28 by a 180° elbow 30 opening on an air inlet or intake orifice 32 suitably connected to the ducts and engine feed devices (not shown). As may be observed in FIG. 2, the cylindrical tubular body 24 has, as a nonlimiting example, a cross section 34 having a substantially rectangular shape with rounded corners, whereof a small side 36 corresponding to the side of the body 24 opposite the elbow 32 carries the branches 37, 38, 39, 40, 41, 42, 43, 44 of the connecting channels of the distributor 10 intended to be connected to the intake ducts of the four cylinders, for example for the first distributed cylinder 15 the branches 37 and 38 are paired respectively with the connecting channels 45 and 46 suitably connected to the intake ducts 19 and 20 provided in the cylinder head 14. As may be observed in FIGS. 1 and 2, the branches 37 to 44 paired in tandem are substantially aligned along the generatrix GA of the cylindrical tubular body 24 parallel to the axis XX' and contained, like the latter axis, in the diametral plane P3 of the main body 24, said diametral plane P3 being parallel to the plane P2 of the combustion face, once the distributor 10 is mounted on the cylinder head.

Considering FIG. 2, it may be observed that the elbow 30 is inclined to the diametral plane P3 by an angle of inclination α defined between the plane P3 and the median plane P4 of the elbow 30 defined as a nonlimiting example as a plane normal to the plane of FIG. 2 and passing through the centers CE and CS of the inlet and outlet sections of the elbow 30 in the flow direction. The angle α is generally selected to be fairly low, preferably between 10 and 25°, in the present case about 20° to the left of FIG. 2 and from P3.

According to the invention, a partial throttling ramp 48 is placed, as shown in FIGS. 1 and 2, at the outlet of the elbow 30 in the neighborhood of the branch 37 of the connecting channel 45 of the first distributed cylinder 15 on the side of the elbow inclination to the diametral plane P3 and substantially opposite and outside the elbow (that is on the side 36 corresponding to the outside of the elbow and on which the connecting branches 37 to 44 are placed). The ramp 48 is in the form of an asymmetrical wheel ramp whereof the upstream 50 and downstream 52 faces are gently- and steeply-inclined respectively, in the present case as shown in FIG. 1 the face 52 is abrupt and at the limit of the branch 37. Moreover, the ramp 48 is laterally inclined to the diametral plane P3 as shown in FIG. 2. Preferably and in a nonlimiting manner, the projection of the top 54 of the ramp 48 in a normal plane to said tubular body 28 (the plane of section AA or plane of FIG. 2) and has an angle of inclination β to the diametral plane P3 of between 1 and 5 times the angle of inclination α, in the present case about 40°. In general, the recessed throttling ramp 48 in the inner duct 25 of the tubular body is produced directly when casting said body or via a part added internally (or in case of a weld-fabricated distributor by an appropriate penetration of the distributor wall at the elbow/tubular body boundary zone). The partial throttling rate is preferably between 2 and 10% of the flow passage (in the present case about 10% as shown in FIG. 2).

Obviously, without going beyond the scope of the invention, the elbow of the air distributor may be inclined in the other direction towards the right of FIG. 2, for example symmetrically about P3, with the understanding that the corresponding partial throttling ramp is also positioned symmetrically to the ramp 28 with regard to said plane P3.

The presence of the ramp 28 has a dual function with regard to the aerodynamics of the air feed to the first distributed cylinder 15, on the one hand to restore a "swirl" level substantially equal to the situation without a distributor, thereby offsetting the drop in "swirl" in the cylinder 15 caused by the inclination of the elbow 30, and on the other, to regulate the flows between the two intake ducts 19 and 20 supplying the same cylinder 15.

The air distributor 10' according to the invention is virtually identical to the distributor 10. Thus, the identical elements of the two distributors are not described again and bear the same reference numerals. In particular, the distributor 10' is shown in FIG. 3 in an underside view, with the partial throttling ramp 48 shown by a dotted line. The two distributors are distinguished by the presence on the distributor 10' at the outlet of the elbow 30 and upstream of the ramp 48 and on the side opposite said ramp, of a recess 60 extending substantially perpendicular to the axis XX', that is with regard to the flow in the inner duct 25 of the tubular body 24. As shown in detail in FIGS. 4 and 5, the recess 60 extends transversally parallel to the plane P3 on the side 62 of the tubular body 24 (opposite the side 61 associated with the ramp 48) along the whole width thereof (large side of the cross section 34) and has a convergent/divergent profile (upstream zone 61/downstream zone 63). The recess 60 generally derives from material in the casting of the air distributor (it may also be produced in the form of an added part or, for weld-fabricated distributors, obtained by deformation of the elbow outlet wall). The recess 60 mainly has the effect of improving the permeability of the distributor 10' (by increasing the air flow rate for a given energy loss) for the first distributed station, the cylinder 15, without negatively affecting the aerodynamic gain of the air distributor obtained by the ramp or wheel ramp 48. It is thus possible to at least offset the slight drop in flow possibly caused by the presence of the partial throttling ramp 48. The recess 60 has the effect of improving the aerodynamic efficiency of the partial throttling ramp 48, thereby decreasing its height and hence improving the permeability.

The invention is not limited to the air distributors and the engines having two intake ducts per cylinder previously described, but also covers their alternatives having a single connecting channel and a single intake duct per distributed cylinder.

The invention claimed is:

1. An air distributor for an internal combustion engine including at least a plurality of cylinders in line, the distributor comprising:
    a substantially cylindrical main tubular body including lateral connecting channels that supply the cylinders, and that branches with the main tubular body open in a substantially aligned manner along a generatrix of the main tubular body, the main tubular body extending upstream of the branches by a substantially 180° elbow opening on an air inlet, the elbow being inclined at an angle to the diametral plane of the main body containing the generatrix for alignment of the branches; and
    a ramp, provided upstream and in the neighborhood of the branch or branches of the connecting channel or channels of the first distributed cylinder and on the elbow inclination side, for partial throttling of an air flow area of the main tubular body.

2. The air distributor as claimed in claim 1, configured to be mounted in parallel to a corresponding intake face of a cylinder head of the engine with the connecting channels placed opposite intake ducts of a cylinder head corresponding to a cylinder and parallel to the cylinder alignment, so that the diametral plane is normal to the cylinder head intake face.

3. The air distributor as claimed in claim 1, wherein the partial throttling rate is between 2 and 10% of the flow area.

4. The air distributor as claimed in claim 1, wherein the ramp is in a form of an asymmetrical wheel ramp whereof upstream and downstream faces are gently- and steeply-inclined respectively.

5. The air distributor as claimed in claim 1, wherein the ramp is laterally inclined to the diametral plane.

6. The air distributor as claimed in claim 5, wherein a projection of the top of the ramp in a normal plane to the tubular body has an angle of inclination to the diametral plane of between 1 and 2 times the angle of inclination of the elbow.

7. The air distributor as claimed in claim 1, further comprising a recess substantially at the elbow outlet, facing and upstream of the ramp, the recess including an extension substantially perpendicular to the air flow direction in the tubular body.

8. The air distributor as claimed in claim 7, wherein the recess has a convergent/divergent profile in the air flow direction in the tubular body.

9. The air distributor as claimed in claim 1, wherein the cylindrical main tubular body has a substantially rectangular cross section with rounded angles, whereof a small side corresponds to the side of the tubular body opposite the elbow and carries the aligned branches of the connecting channels.

10. The air distributor as claimed in claim 1, comprising two connecting intake channels per distributed cylinder.

11. An internal combustion engine, comprising at least one air distributor as claimed in claim 1, comprising one or two connecting intake channels per distributed cylinder and mounted on an intake face of a cylinder head of the engine.

12. An internal combustion engine of diesel type, comprising at least one air distributor as claimed in claim 1, comprising one or two connecting channels per distributed cylinder and mounted on an intake face of a cylinder head of the engine.

* * * * *